United States Patent
Morisaki

(10) Patent No.: US 10,583,827 B2
(45) Date of Patent: Mar. 10, 2020

(54) HYBRID VEHICLE AND CONTROL DEVICE MOUNTED THEREON

(71) Applicant: TOYOTA JIDOSHA KABUSHIKI KAISHA, Toyota-shi, Aichi-ken (JP)

(72) Inventor: Keisuke Morisaki, Toyota (JP)

(73) Assignee: TOYOTA JIDOSHA KABUSHIKI KAISHA, Toyota-shi, Aichi-ken (JP)

(*) Notice: Subject to any disclaimer, the term of this patent is extended or adjusted under 35 U.S.C. 154(b) by 0 days.

(21) Appl. No.: 16/176,051

(22) Filed: Oct. 31, 2018

(65) Prior Publication Data

US 2019/0168739 A1 Jun. 6, 2019

(30) Foreign Application Priority Data

Dec. 5, 2017 (JP) .................. 2017-233645

(51) Int. Cl.
  *B60W 20/13* (2016.01)
  *B60W 20/12* (2016.01)
  *B60W 10/26* (2006.01)
  *B60W 10/06* (2006.01)
  *B60W 10/08* (2006.01)

(52) U.S. Cl.
  CPC .......... *B60W 20/13* (2016.01); *B60W 10/06* (2013.01); *B60W 10/08* (2013.01); *B60W 10/26* (2013.01); *B60W 20/12* (2016.01); B60W 2510/0676 (2013.01); B60W 2510/087 (2013.01); B60W 2510/244 (2013.01); B60W 2510/246 (2013.01); B60W 2550/402 (2013.01); B60W 2710/244 (2013.01)

(58) Field of Classification Search
  CPC ............................................. B60W 20/10–19
  See application file for complete search history.

(56) References Cited

U.S. PATENT DOCUMENTS

| 8,892,286 B2* | 11/2014 | Morita ............... B60K 6/445 701/22 |
| 9,126,585 B2* | 9/2015 | Takizawa ............ B60K 6/445 |
| 2008/0115997 A1* | 5/2008 | Banno ............... B60K 23/08 180/242 |
| 2010/0145561 A1* | 6/2010 | Song .................. B60K 6/48 701/22 |

(Continued)

FOREIGN PATENT DOCUMENTS

| JP | 2011-063186 A | 3/2011 |
| JP | 2017-081416 A | 5/2017 |

*Primary Examiner* — Erez Gurari
(74) *Attorney, Agent, or Firm* — Sughrue Mion, PLLC

(57) ABSTRACT

When parking is expected at a predetermined point, state of charge reduction control is performed in a current trip to control an engine and a motor such that the state of charge of a power storage device when parking is expected at the predetermined point is lower than the state of charge of the power storage device when parking is not expected at the predetermined point. State of charge recovery control is then performed in a next trip to control the engine and the motor such that the state of charge is recovered during operation of the engine. Even when parking is expected at the predetermined point, execution of the state of charge reduction control is restricted in the case where the temperature of the motor is higher than a predetermined temperature.

8 Claims, 11 Drawing Sheets

(56) References Cited

U.S. PATENT DOCUMENTS

| | | | |
|---|---|---|---|
| 2010/0274428 A1* | 10/2010 | Hwang | B66F 9/24 701/22 |
| 2011/0071712 A1 | 3/2011 | Mizuno et al. | |
| 2011/0160965 A1* | 6/2011 | Oh | B62D 5/0481 701/42 |
| 2014/0229052 A1* | 8/2014 | Takizawa | B60W 10/30 701/22 |
| 2014/0236410 A1* | 8/2014 | Takizawa | B60K 6/445 701/22 |
| 2015/0022133 A1* | 1/2015 | Sauer | H02P 29/02 318/473 |
| 2016/0001659 A1* | 1/2016 | Huh | B60L 58/12 701/70 |
| 2016/0137068 A1* | 5/2016 | Nada | B60L 7/26 701/70 |
| 2016/0264128 A1* | 9/2016 | Imamura | B60K 6/445 |
| 2017/0120888 A1 | 5/2017 | Jinno | |
| 2017/0361837 A1* | 12/2017 | Morisaki | B60W 20/13 |
| 2018/0186362 A1* | 7/2018 | Koga | F16H 61/02 |
| 2018/0201116 A1* | 7/2018 | Miyagawa | B60K 6/442 |

\* cited by examiner

HYBRID VEHICLE AND CONTROL DEVICE MOUNTED THEREON

CROSS-REFERENCE TO RELATED APPLICATION

This application claims priority to Japanese Patent Application No. 2017-233645 filed on Dec. 5, 2017, the contents of which is incorporated herein by reference.

TECHNICAL FIELD

The present disclosure relates to a hybrid vehicle and a control device mounted thereon and more specifically relates to a hybrid vehicle including an engine, a motor and a power storage device as well as to a control device mounted on such a hybrid vehicle.

BACKGROUND

A hybrid vehicle includes an engine, a motor and a battery and is configured to control the engine and the motor such that the hybrid vehicle is driven with the state of charge of the battery approaching a target state of charge. A proposed configuration of the hybrid vehicle changes the target state of charge of the battery to a special target state of charge that is lower than a basic target state of charge when the hybrid vehicle reaches a point that is a predetermined distance prior to a parking point (destination) where a parking time is expected to be longer than a predetermined time period, in a driving route of the hybrid vehicle, and returns the state of charge to the basic target state of charge when the hybrid vehicle restarts from the parking point in a next trip (as described in, for example, JP 2017-81416A). The hybrid vehicle of this proposed configuration enables the state of charge of the battery at a restart from the parking point to be sufficiently lower than the basic target state of charge (to be close to the special target state of charge) by such control. This applies a load to the engine and enhances the charging (cold charging) efficiency of the battery in an engine drive (cold drive) serving to warm up the engine.

CITATION LIST

Patent Literature

PTL 1: JP2017-081416A

SUMMARY

The hybrid vehicle of the above configuration changes the target state of charge of the battery from the basic target state of charge to the special target state of charge. This reduces the load of the engine, is likely to increase the driving load applied to the motor and is thus likely to increase the temperature of the motor. An excessive temperature rise of the motor is likely to cause deterioration of the power performance of the motor due to driving restriction for the purpose of protection of the motor and thereby cause deterioration of the driving performance of the vehicle.

A hybrid vehicle and a control device mounted thereon according to the present disclosure mainly aim to suppress an excessive temperature rise of a motor.

In order to achieve the above primary object, the hybrid vehicle and control device mounted thereon of the disclosure is implemented by an aspect described below.

The present disclosure is directed to a hybrid vehicle. The first hybrid vehicle includes an engine, a motor, a power storage device configured to transmit electric power to and from the motor, and a control device configured to, when parking is expected at a predetermined point, perform state of charge reduction control in a current trip and to perform state of charge recovery control in a next trip, wherein the state of charge reduction control controls the engine and the motor such that state of charge of the power storage device when parking is expected at the predetermined point is lower than the state of charge of the power storage device when parking is not expected at the predetermined point, and the state of charge recovery control controls the engine and the motor such that the state of charge of the power storage device is recovered during operation of the engine. Even when parking is expected at the predetermined point, the control device restricts execution of the state of charge reduction control, in a case where a temperature of the motor is higher than a predetermined temperature.

When parking is expected at the predetermined point, the first hybrid vehicle of this aspect performs the state of charge reduction control in the current trip to control the engine and the motor such that the state of charge of the power storage device when parking is expected at the predetermined point is lower than the state of charge of the power storage device when parking is not expected at the predetermined point. The first hybrid vehicle of this aspect then performs the state of charge recovery control in the next trip to control the engine and the motor such that the state of charge of the power storage device is recovered during operation of the engine. Even when parking is expected at the predetermined point, in the case where the temperature of the motor is higher than the predetermined temperature, the first hybrid vehicle of this aspect restricts execution of the state of charge reduction control. This configuration suppresses an excessive temperature rise of the motor. As a result, this suppresses deterioration of the power performance of the motor and thereby suppresses deterioration of the driving performance of the vehicle. The "predetermined temperature" is determined to be a lower temperature than a restriction start temperature to start restriction of driving the motor for the purpose of protection of the motor. The "restriction of execution of the state of charge reduction control" includes execution of second state of charge reduction control that restricts an amount of reduction in the state of charge of the power storage device compared with the state of charge reduction control, and prohibition of execution of the state of charge reduction control.

The second hybrid vehicle includes an engine, a motor, a power storage device configured to transmit electric power to and from the motor and a control device configured to, when parking is expected at a predetermined point, perform state of charge reduction control in a current trip and to perform state of charge recovery control in a next trip. The state of charge reduction control controls the engine and the motor such that state of charge of the power storage device when parking is expected at the predetermined point is lower than the state of charge of the power storage device when parking is not expected at the predetermined point, and the state of charge recovery control controls the engine and the motor such that the state of charge of the power storage device is recovered during operation of the engine. When the hybrid vehicle is in a low speed high load drive having a vehicle speed that is equal to or lower than a predetermined vehicle speed and having a load that exceeds or is expected to exceed a predetermined load, the control device forcibly drives a pressure feed pump configured to press feed a cooling medium to the motor, while performing the state of charge reduction control.

When parking is expected at the predetermined point, the second hybrid vehicle of this aspect performs the state of charge reduction control in the current trip to control the engine and the motor such that the state of charge of the power storage device when parking is expected at the predetermined point is lower than the state of charge of the power storage device when parking is not expected at the predetermined point. The second hybrid vehicle of this aspect then performs the state of charge recovery control in the next trip to control the engine and the motor such that the state of charge of the power storage device is recovered during operation of the engine. When the hybrid vehicle is in the low speed high load drive having the vehicle speed that is equal to or lower than the predetermined vehicle speed and having the load that exceeds the predetermined load or that is expected to exceed the predetermined load, the second hybrid vehicle of this aspect forcibly drives the pressure feed pump configured to press feed the cooling medium to the motor, while performing the state of charge reduction control. This configuration suppresses a temperature rise of the motor, while performing the state of charge reduction control. As a result, this suppresses deterioration of the power performance of the motor and thereby suppresses deterioration of the driving performance of the vehicle. "Forcibly driving the pressure feed pump" herein means that the pressure feed pump is driven irrespective of the temperature of the motor.

The present disclosure is directed to a control device mounted on a hybrid vehicle. The first control device mounted on a hybrid vehicle includes an engine, a motor, and a power storage device configured to transmit electric power to and from the motor, the control device being configured to, when parking is expected at a predetermined point, perform state of charge reduction control in a current trip and to perform state of charge recovery control in a next trip, wherein the state of charge reduction control controls the engine and the motor such that state of charge of the power storage device when parking is expected at the predetermined point is lower than the state of charge of the power storage device when parking is not expected at the predetermined point, and the state of charge recovery control controls the engine and the motor such that the state of charge of the power storage device is recovered during operation of the engine, even when parking is expected at the predetermined point, the control device restricts execution of the state of charge reduction control, in a case where a temperature of the motor is higher than a predetermined temperature.

When parking is expected at the predetermined point, the first control device of this aspect performs the state of charge reduction control in the current trip to control the engine and the motor such that the state of charge of the power storage device when parking is expected at the predetermined point is lower than the state of charge of the power storage device when parking is not expected at the predetermined point. The first control device of this aspect then performs the state of charge recovery control in the next trip to control the engine and the motor such that the state of charge of the power storage device is recovered during operation of the engine. Even when parking is expected at the predetermined point, in the case where the temperature of the motor is higher than the predetermined temperature, the first control device of this aspect restricts execution of the state of charge reduction control. This configuration suppresses an excessive temperature rise of the motor. As a result, this suppresses deterioration of the power performance of the motor and thereby suppresses deterioration of the driving performance of the vehicle. The "predetermined temperature" is determined to be a lower temperature than a restriction start temperature to start restriction of driving the motor for the purpose of protection of the motor. The "restriction of execution of the state of charge reduction control" includes execution of second state of charge reduction control that restricts an amount of reduction in the state of charge of the power storage device compared with the state of charge reduction control, and prohibition of execution of the state of charge reduction control.

The second control device mounted on a hybrid vehicle includes an engine, a motor, and a power storage device configured to transmit electric power to and from the motor, the control device being configured to, when parking is expected at a predetermined point, perform state of charge reduction control in a current trip and to perform state of charge recovery control in a next trip, wherein the state of charge reduction control controls the engine and the motor such that state of charge of the power storage device when parking is expected at the predetermined point is lower than the state of charge of the power storage device when parking is not expected at the predetermined point, and the state of charge recovery control controls the engine and the motor such that the state of charge of the power storage device is recovered during operation of the engine, when the hybrid vehicle is in a low speed high load drive having a vehicle speed that is equal to or lower than a predetermined vehicle speed and having a load that exceeds or is expected to exceed a predetermined load, the control device forcibly drives a pressure feed pump configured to press feed a cooling medium to the motor, while performing the state of charge reduction control.

When parking is expected at the predetermined point, the second control device of this aspect performs the state of charge reduction control in the current trip to control the engine and the motor such that the state of charge of the power storage device when parking is expected at the predetermined point is lower than the state of charge of the power storage device when parking is not expected at the predetermined point. The second control device of this aspect then performs the state of charge recovery control in the next trip to control the engine and the motor such that the state of charge of the power storage device is recovered during operation of the engine. When the hybrid vehicle is in the low speed high load drive having the vehicle speed that is equal to or lower than the predetermined vehicle speed and having the load that exceeds the predetermined load or that is expected to exceed the predetermined load, the second control device of this aspect forcibly drives the pressure feed pump configured to press feed the cooling medium to the motor, while performing the state of charge reduction control. This configuration suppresses a temperature rise of the motor, while performing the state of charge reduction control. As a result, this suppresses deterioration of the power performance of the motor and thereby suppresses deterioration of the driving performance of the vehicle. "Forcibly driving the pressure feed pump" herein means that the pressure feed pump is driven irrespective of the temperature of the motor.

DESCRIPTION OF EMBODIMENTS

The following describes aspects of the present disclosure with reference to some embodiments.

Figure 1:
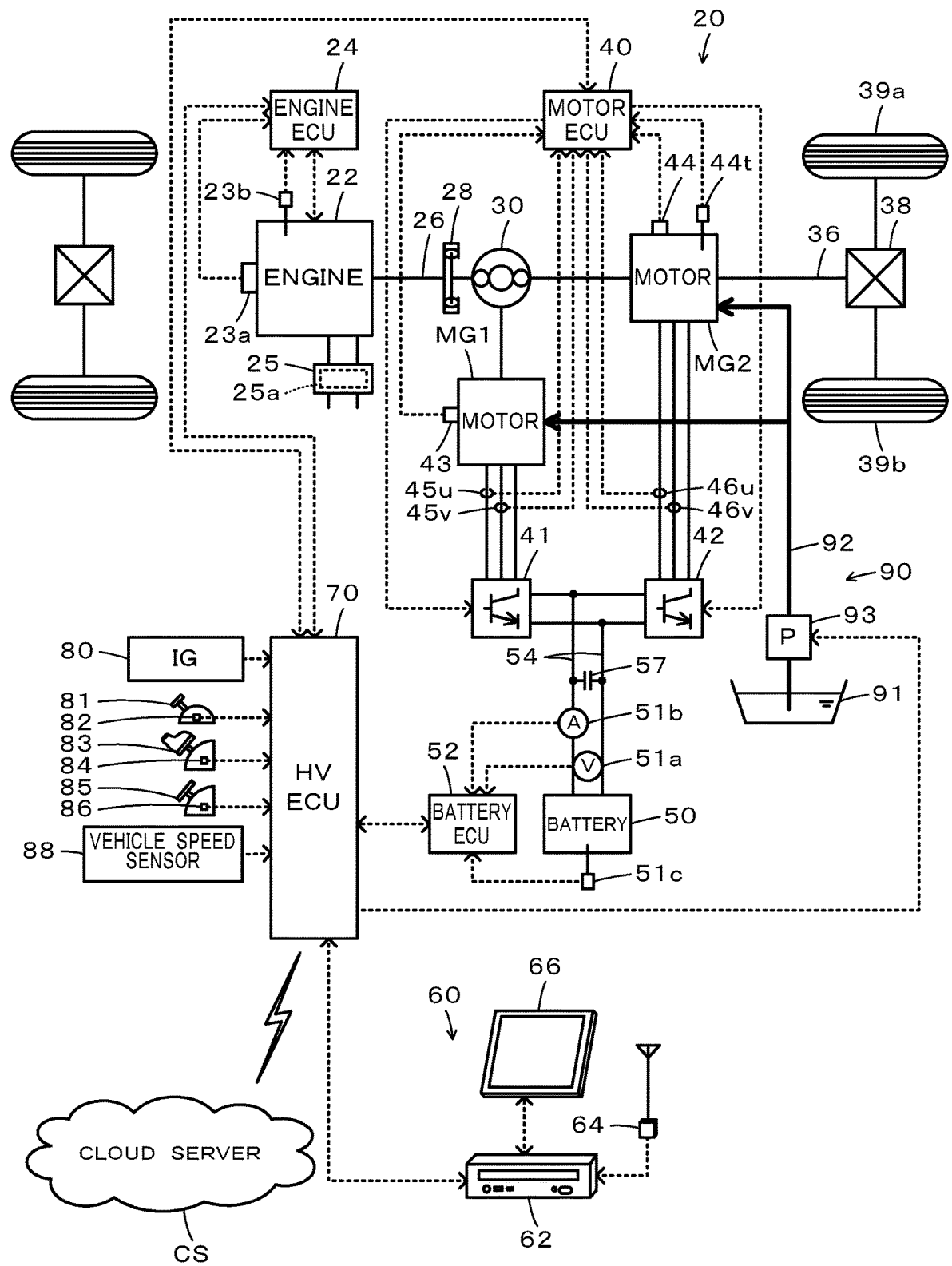
FIG. 1 is a configuration diagram illustrating the schematic configuration of a hybrid vehicle according to one embodiment of the present disclosure.

FIG. 1 is a configuration diagram illustrating the schematic configuration of a hybrid vehicle 20 according to one embodiment of the present disclosure. As illustrated, the hybrid vehicle 20 of the embodiment includes an engine 22, a planetary gear 30, motors MG1 and MG2, inverters 41 and 42, a cooling device 90, a battery 50 serving as a power storage device, a vehicle-mounted navigation system 60, and a hybrid electronic control unit (hereinafter referred to as "HVECU") 70.

The engine 22 is configured as an internal combustion engine to output power using, for example, gasoline or light oil as a fuel and is connected with a carrier of the planetary gear 30 via a damper 28. An exhaust emission control device 25 filled with a catalyst 25a for exhaust emission control of the engine 22 is provided in an exhaust system of the engine 22. The engine 22 is operated and controlled by an engine electronic control unit (hereinafter referred to as "engine ECU") 24.

The engine ECU 24 is configured as a CPU-based microprocessor and includes a ROM configured to store processing programs, a RAM configured to temporarily store data, input/output ports and a communication port, in addition to the CPU, although not being illustrated. Signals from various sensors required for operation control of the engine 22, for example, a crank angle θcr from a crank position sensor 23a configured to detect the rotational position of a crankshaft 26 of the engine 22 and a cooling water temperature Tw from a water temperature sensor 23b configured to detect the temperature of cooling water of the engine 22, are input into the engine ECU 24 via the input port. Various control signals for operation control of the engine 22 are output from the engine ECU 24 via the output port. The engine ECU 24 is connected with the HVECU 70 via the respective communication ports. The engine ECU 24 calculates a rotation speed Ne of the engine 22, based on the crank angle θcr input from the crank position sensor 23a, while estimating a temperature Tc of the catalyst 25a (catalyst temperature Tc), based on, for example, the cooling water temperature Tw input from the water temperature sensor 23b.

The planetary gear 30 is configured as a single pinion-type planetary gear mechanism. The planetary gear 30 includes a sun gear that is connected with a rotor of the motor MG1. The planetary gear 30 also includes a ring gear that is connected with a driveshaft 36 which is coupled with drive wheels 39a and 39b via a differential gear 38. The planetary gear 30 further includes a carrier that is connected with the crankshaft 26 of the engine 22 via the damper 28 as described above.

The motor MG1 may be configured, for example, as a synchronous generator motor and includes the rotor that is connected with the sun gear of the planetary gear 30 as described above. The motor MG2 may be configured, for example, as a synchronous generator motor and includes a rotor that is connected with the driveshaft 36. The inverters 41 and 42 are used to respectively drive the motors MG1 and MG2 and are connected with the battery 50 via power lines 54. A capacitor 57 for smoothing is mounted to the power lines 54. A motor electronic control unit (hereinafter referred to as "motor ECU") 40 performs switching control of a plurality of switching elements (not shown) respectively included in the inverters 41 and 42, so as to rotate and drive the motors MG1 and MG2.

The motor ECU 40 is configured as a CPU-based microprocessor and includes a ROM configured to store processing programs, a RAM configured to temporarily store data, input/output ports, and a communication port, in addition to the CPU, although not being illustrated. Signals from various sensors required for drive control of the motors MG1 and MG2, for example, rotational positions θm1 and θm2 from rotational position detection sensors 43 and 44 configured to detect the rotational positions of the respective rotors of the motors MG1 and MG2, phase currents Iu1, Iv1, Iu2 and Iv2 from current sensors 45u, 45v, 46u and 46v configured to detect electric currents flowing in the respective phases of the motors MG1 and MG2, and a temperature tm2 from a temperature sensor 44t configured to detect the temperature of the motor MG2, are input into the motor ECU 40 via the input port. The motor ECU 40 outputs via the output port, for example, switching control signals to the plurality of switching elements (not shown) included in the respective inverters 41 and 42. The motor ECU 40 is connected with the HVECU 70 via the respective communication ports. The motor ECU 40 calculates electrical angles θe1 and θe2, angular velocities ωm1 and ωm2 and rotation speeds Nm1 and Nm2 of the respective motors MG1 and MG2, based on the rotational positions θ m1 and θm2 of the respective rotors of the motors MG1 and MG2 input from the rotational position detection sensors 43 and 44.

The cooling device 90 is configured as a system to cool down the motors MG1 and MG2 by using an oil coolant. The cooling device 90 includes a reservoir 91 configured to store the oil coolant therein, a supply flow path 92 arranged to supply the oil coolant stored in the reservoir 91 to the respective motors MG1 and MG2, and a pressure feed pump 93 provided in the supply flow path 92 and configured to pneumatically feed the oil coolant stored in the reservoir 91 toward the respective motors MG1 and MG2. The pressure feed pump 93 is driven and controlled by the HVECU 70.

The battery 50 is configured as, for example, a lithium ion rechargeable battery or a nickel metal hydride battery and is connected with the power lines 54. This battery 50 is under management of a battery electronic control unit (hereinafter referred to as "battery ECU") 52.

The battery ECU 52 is configured as a CPU-based microprocessor and includes a ROM configured to store processing programs, a RAM configured to temporarily store data, input/output ports, and a communication port, in addition to the CPU, although not being illustrated. Signals from various sensors required for management of the battery 50 are input into the battery ECU 52 via the input port. The signals input into the battery ECU 52 include, for example, a voltage Vb of the battery 50 from a voltage sensor 51a placed between terminals of the battery 50, an electric current Ib of the battery 50 from a current sensor 51b mounted to an output terminal of the battery 50, and a temperature Tb of the battery 50 from a temperature sensor 51c mounted to the battery 50. The battery ECU 52 is connected with the HVECU 70 via the respective communication ports. The battery ECU 52 calculates a state of charge SOC, based on an integrated value of the electric current Ib of the battery 50 input from the current sensor 51b. The battery ECU 52 also calculates an input limit Win and an output limit Wout, based on the calculated state of charge SOC and the temperature Tb of the battery 50 input from the temperature sensor 51c. The state of charge SOC denotes a ratio of the capacity of electric power dischargeable from the battery 50 to the overall capacity of the battery 50. The input limit Win and the output limit Wout denote an allowable charging power and an allowable discharging power that are chargeable into and dischargeable from the battery 50. For example, a procedure employable to determine the input limit Win and the output limit Wout may set base values Wintmp and Wouttmp of the input limit Win and the output limit Wout, based on the temperature Tb of the battery 50, set correction factors kin and kout, based on the state of charge SOC of the battery 50, and respectively multiply the base values Wintmp and Wouttmp by the correction factors kin and kout to set the products as the input limit Win and the output limit Wout. More specifically, the output limit Wout of the battery 50 is set to decrease with an increase in deviation of the temperature Tb of the battery 50 from an allowable temperature range to the higher temperature or to the lower temperature and is also set to decrease with a decrease in state of charge SOC of the battery 50. The input limit Win of the battery 50 is set to increase (i.e., to decrease as an absolute value) with an increase in deviation of the temperature Tb of the battery 50 from the allowable temperature range to the higher temperature or to the lower temperature and is also set to increase (i.e., to decrease as an absolute value) with an increase in state of charge SOC of the battery 50.

The vehicle-mounted navigation system 60 includes a main body 62 provided with a built-in storage medium such as a hard disk drive, in which map information and the like are stored, and with a built-in controller having input/output ports and a communication port; a GPS antenna 64 provided to receive information regarding the current location of the own vehicle; and a touch panel display 66 configured to display the information regarding the current location of the own vehicle, an estimated driving route to a destination, and the like and to allow the user to enter various instructions. The map information is stored in the form of a database and includes service information (for example, tourism information and parking places) and road information of predetermined driving intervals (for example, intervals between traffic lights and intervals between intersections). The road information includes distance information, road width information, number of lanes information, district information (urban or suburban), road type information (general road, expressway, toll road), slope information, legal speed limits, and the number of signals. The vehicle-mounted navigation system 60 is connected with the HVECU 70 via the respective communication ports.

When the user operates the display 66 to set a destination, this vehicle-mounted navigation system 60 sets an estimated driving route from the current location of the vehicle to the destination, based on the map information, the current location of the own vehicle and the user's set destination, displays the set estimated driving route on the display 66, and performs route guidance.

The HVECU 70 is configured as a CPU-based microprocessor and includes a ROM configured to store processing programs, a RAM configured to temporarily store data, input/output ports, and a communication port, in addition to the CPU, although not being illustrated. Signals from various sensors are input into the HVECU 70 via the input port. The signals input into the HVECU 70 include, for example, an ignition signal from an ignition switch 80 and a shift position SP from a shift position sensor 82 configured to detect an operating position of a shift lever 81. The input signals also include an accelerator position Acc from an accelerator pedal position sensor 84 configured to detect a depression amount of an accelerator pedal 83, a brake pedal position BP from a brake pedal position sensor 86 configured to detect a depression amount of a brake pedal 85, and a vehicle speed V from a vehicle speed sensor 88. The HVECU 70 outputs, for example, a drive control signal to the pressure feed pump 93 via the output port. The HVECU 70 is connected with the engine ECU 24, the motor ECU 40, the battery ECU 52 and the vehicle-mounted navigation system 60 via the respective communication ports as described above. The HVECU 70 is also configured to be communicable with a cloud server CS by wireless communication.

The cloud server CS is configured to be communicable with respective vehicles including the hybrid vehicle 20 by wireless communication and has driving history information of the respective vehicles accumulated therein. The driving history information includes, for example, a parking position, the date and time of parking, and a parking time. In the description below, a parking having the parking time longer than a predetermined time period T1 (for example, five hours, six hours or seven hours) is called "long time parking", and a parking having the parking time equal to or shorter than the predetermined time period T1 is called "short time parking". A point of the long time parking in a past trip is called "long time parking point", and a point of the short time parking in a past trip is called "short time parking point". When a certain point corresponds to both the long time parking point and the short time parking point, the certain point may be set as either the long time parking point or the short time parking point according to the day of the week and the time of day or may be set as either the long time parking point or the short time parking point according to the average parking time or the like. The predetermined time period T1 is determined, for example, as a time period required to sufficiently cool down the engine 22 and the catalyst 25a. The predetermined time period T1 may be a fixed time or may be a variable time that may be varied according to the ambient temperature or the like.

The cloud server CS also estimates a destination (point of arrival) of a current trip with regard to each vehicle by referring to its long time parking points and short time parking points, based on the driving history information and a starting position of the current trip (starting point). For example, when the starting point is a point A (for example, the user's home) in the morning of a weekday, a point B (for example, the user's working place) is estimated as a destination. When the starting point is other than the point A in the afternoon of a weekday or in a weekend, the point A is estimated as a destination. When the starting point is the point A in the afternoon of a weekday or in a weekend, the destination cannot be estimated (destination is unknown).

The hybrid vehicle 20 of the embodiment having the above configuration may be driven in a hybrid drive mode (HV drive mode) with operation of the engine 22 or may be driven in a motor drive mode (EV drive mode) with no operation of the engine 22.

Figure 2:
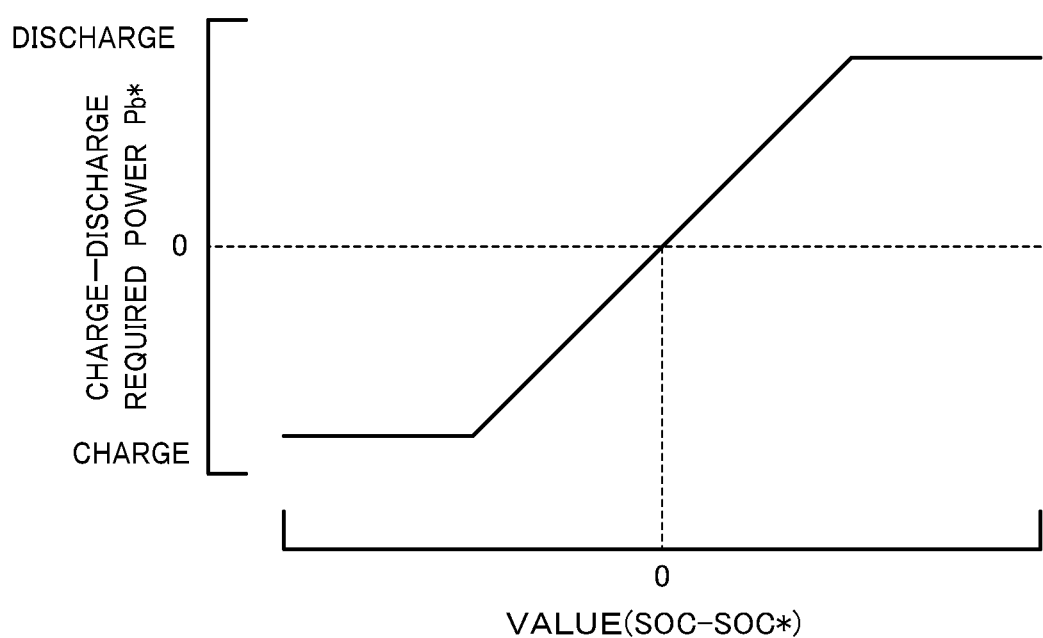
FIG. 2 is a diagram illustrating one example of a charge-discharge required power setting map.

In the HV drive mode, the HVECU 70 sets a required torque Td* that is required for the driveshaft 36, based on the accelerator position Acc and the vehicle speed V, and calculates a required power Pd* that is required for the driveshaft 36 by multiplying the set required torque Td* by a rotation speed Nd of the driveshaft 36 (rotation speed Nm2 of the motor MG2). The HVECU 70 subsequently sets a charge-discharge required power Pb* which the battery 50 requires (and which takes a positive value when the battery 50 is discharged), based on the state of charge SOC and a target state of charge SOC* of the battery 50. The target state of charge SOC* of the battery 50 is set according to a target state of charge setting routine described later. The charge-discharge required power Pb* of the battery 50 is set such that a difference (SOC−SOC*) by subtracting the target state of charge SOC* from the state of charge SOC of the battery 50 becomes close to a value 0 (i.e., approaches zero). FIG. 2 is a diagram illustrating one example of a charge-discharge required power setting map. As illustrated, the charge-discharge required power Pb* of the battery 50 is set to a value 0 at the difference (SOC−SOC*) equal to 0, is set to a value having a tendency of increasing the absolute value in a positive range (i.e., range for discharging) with an increase in the difference (SOC−SOC*) when the difference (SOC−SOC*) is a positive value, and is set to a value having a tendency of increasing the absolute value in a negative range (i.e., range for charging) with a decrease in the difference (SOC−SOC*) when the difference (SOC−SOC*) is a negative value.

The HVECU 70 subsequently sets a required power Pe* that is required for the engine 22 by subtracting the charge-discharge required power Pb* of the battery 50 from the required power Pd*, and sets a target rotation speed Ne* and a target torque Te* of the engine 22 and torque commands Tm1* and Tm2* of the motors MG1 and MG2 such that the required power Pe* is output from the engine 22 and that the required torque Td* is output to the driveshaft 36 within the range of the input limit Win and the output limit Wout of the battery 50. The HVECU 70 then sends the target rotation speed Ne* and the target torque Te* of the engine 22 to the engine ECU 24, while sending the torque commands Tm1* and Tm2* of the motors MG1 and MG2 to the motor ECU 40. When receiving the target rotation speed Ne* and the target torque Te* of the engine 22, the engine ECU 24 performs operation control of the engine 22 (for example, intake air flow control, fuel injection control and ignition control) such that the engine 22 is operated with the target rotation speed Ne* and the target torque Te*. When receiving the torque commands Tm1* and Tm2* of the motors MG1 and MG2, the motor ECU 40 performs switching control of the plurality of switching elements included in the inverters 41 and 42, such that the motors MG1 and MG2 are driven with the torque commands Tm1* and Tm2*.

In this HV drive mode, it is determined that stop conditions of the engine 22 are met, upon satisfaction of all conditions, for example, a condition that the required power Pe* is lower than a stop reference value Pstop, a condition that neither a request for warming up the engine 22 nor a request for warming up the catalyst 25a is made, and a condition that no request is made for heating the passenger compartment using the engine 22 as a heat source. When the stop conditions are met, the HVECU 70 stops operation of the engine 22 and shifts the drive mode to the EV drive mode. The request for warming up the engine 22 is made when the cooling water temperature Tw of the engine 22 is lower than a predetermined temperature Twref (for example, 70° C., 75° C. or 80° C.). The request for warming up the catalyst 25a is made when the temperature Tc of the catalyst 25a (catalyst temperature Tc) is lower than a predetermined temperature Tcref (for example, 350° C., 400° C. or 450° C.).

In the EV drive mode, the HVECU 70 sets the required torque Td* that is required for the driveshaft 36, based on the accelerator position Acc and the vehicle speed V. The HVECU 70 subsequently sets a value 0 to the torque command Tm1* of the motor MG1 and sets the torque command Tm2* of the motor MG2 such that the required torque Td* is output to the driveshaft 36 in the range of the input limit Win and the output limit Wout of the battery 50. The HVECU 70 then sends the torque commands Tm1* and Tm2* of the motors MG1 and MG2 to the motor ECU 40. The motor ECU 40 controls the inverters 41 and 42 as described above.

In this EV drive mode, it is determined that start conditions of the engine 22 are met, upon satisfaction of at least one of conditions, for example, a condition that the required power Pe* calculated in the same manner as that in the HV drive mode is equal to or higher than a start reference value Pstart, a condition that a request is made for warming up the engine 22 or for warming up the catalyst 25a, and that a request is made for heating the passenger compartment. When the start conditions are met, the HVECU 70 starts the engine 22 and shifts the drive mode to the HV drive mode. The start reference value Pstart is preferably a larger value than the stop reference value Pstop by a certain margin (for example, about several kW), in order to suppress a frequent changeover between the start and the stop of the engine 22 within a short time period.

Figure 3:
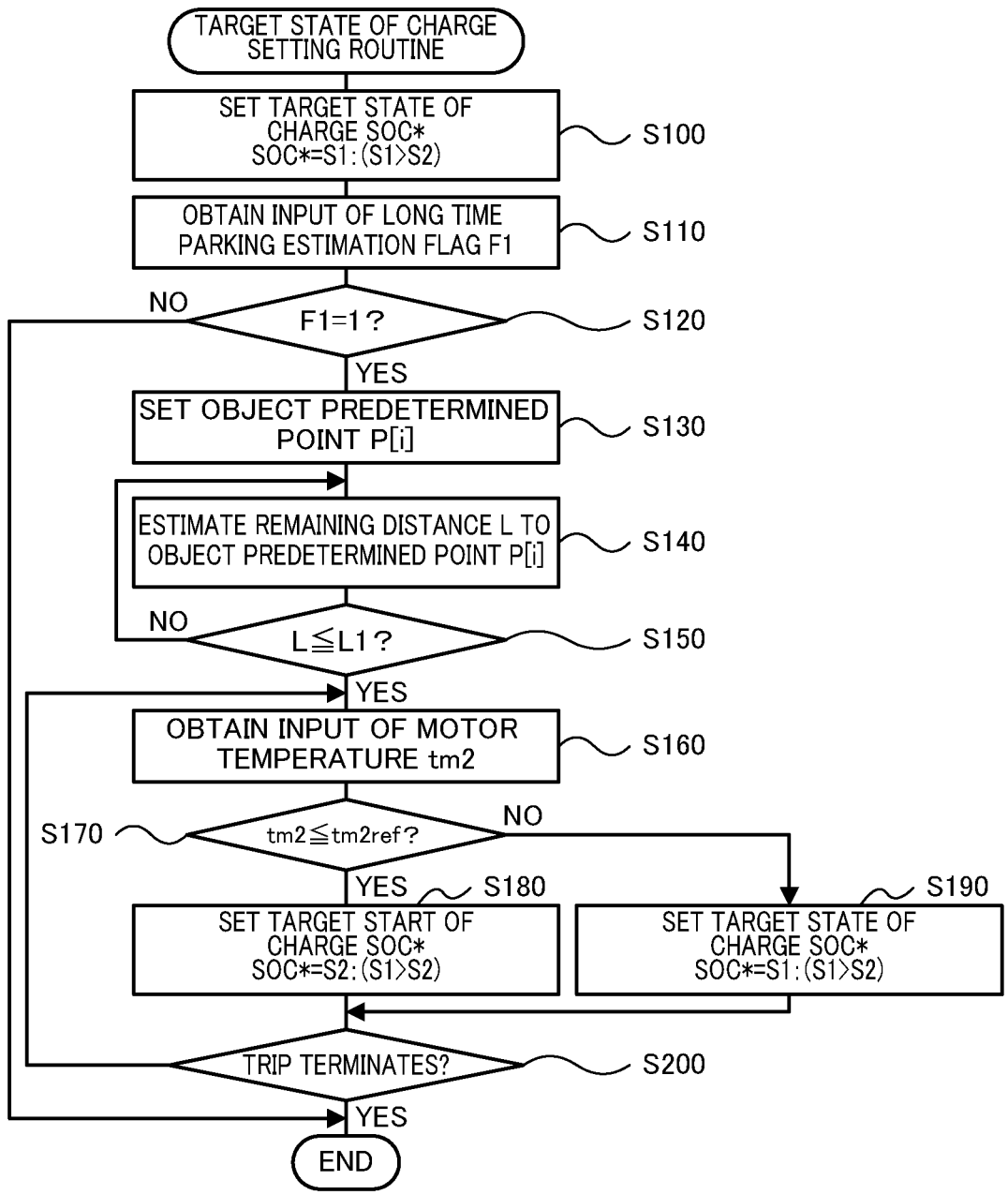
FIG. 3 is a flowchart showing one example of a target state of charge setting routine performed by an HVECU.

The following describes the operations of the hybrid vehicle 20 of the embodiment having the above configuration and more specifically a series of processing to set the target state of charge SOC* of the battery 50. FIG. 3 is a flowchart showing one example of a target state of charge setting routine performed by the HVECU 70. This routine is performed at the start of each trip (when the ignition switch 80 is turned ON).

When the target state of charge setting routine shown in FIG. 3 is triggered, the HVECU 70 first sets a predetermined value S1 to the target state of charge SOC* of the battery 50 (step S100). The predetermined value S1 used here may be, for example, 58%, 60% or 62%.

The HVECU 70 subsequently obtains the input of a long time parking estimation flag F1 (step S110) and checks the value of the input long time parking estimation flag F1 (step S120) The long time parking estimation flag F1 input here is set to a value 1 when a long time parking is expected at a predetermined point, while being set to a value 0 when the long time parking is not expected. The "predetermined point" denotes a position where there is a possibility of a long time parking and may be, for example, the user's home, the user's working place, a shopping mall, a leisure facility or an accommodation facility. The "predetermined points" include points set (registered) in advance prior to shipment of the vehicle, points set (registered) through the user's operations of the display 66, and long time parking points input from the cloud server CS by wireless communication.

The determination of whether a long time parking is expected at a predetermined point may be made as described below. When a destination is set by the user, this determination may be based on determination of whether the set destination is included in the predetermined points and based on determination of whether an expected arrival time to the set destination is included in the day of the week and the time of day when the long time parking is expected. When no destination is set by the user, on the other hand, this determination may be based on determination of whether a destination is estimated by the cloud server CS, based on determination of whether the estimated destination is included in the predetermined points, and based on determination of whether an expected arrival time to the estimated destination is included in the day of the week and the time of day when the long time parking is expected. A certain time period is required between the start of a trip to setting of a destination. The processing of step S110 may accordingly be performed when a destination is set by the user, when a certain time period has elapsed, or the hybrid vehicle 20 is driven by a certain distance after the processing of step S100 is performed.

When the long time parking estimation flag F1 is equal to the value 0 at step S120, the HVECU 70 determines that a long time parking is not expected at the predetermined point and terminates this routine. In this case, the target state of charge SOC* of the battery 50 is kept at the predetermined value S1 until the end of the current trip.

When the long time parking estimation flag F1 is equal to the value 1 at step S120, on the other hand, the HVECU 70 determines that a long time parking is expected at the predetermined point and sets either a destination set by the user or a destination estimated by the cloud server CS as an object predetermined point P[i] (step S130). Herein [i] represents a number corresponding to each place, such as the user's home, the user's working place, a shopping mall, a leisure facility, or an accommodation facility.

The HVECU 70 subsequently estimates a remaining distance L to the object predetermined point P[i], based on the current location, the destination and the map information (step S140) and compares the estimated remaining distance L with a predetermined distance L1 (for example, 3 km, 4 km or 5 km) (step S150). When the remaining distance L is longer than the predetermined distance L1, the HVECU 70 goes back to step S140. The HVECU 70 repeats the processing of steps S140 and S150 until the remaining distance L to the object predetermined point P[i] becomes equal to or shorter than the predetermined distance L1.

When it is determined at step S150 that the remaining distance L to the object predetermined point P[i] becomes equal to or shorter than the predetermined distance L1, the HVECU 70 obtains the input of the temperature tm2 of the motor MG2 (step S160) and compares the input temperature tm2 of the motor MG2 with a reference value tm2ref (step S170). The temperature tm2 of the motor MG2 is a value detected by the temperature sensor 44t and input from the motor ECU 40 by communication. The reference value tm2ref is determined to be a slightly lower temperature than a restriction start temperature tm2lim which starts driving restriction to make a driving range (torque range) of the motor MG2 lower than a rated value for the purpose of protection of the motor MG2. For example, when the restriction start temperature tm2lim is 150° C., 160° C. or 170° C., the reference value tm2ref used may be a temperature lower than the restriction start temperature tm2lim by 10° C., 15° C. or 20° C.

When the temperature tm2 of the motor MG2 is equal to or lower than the reference value tm2ref at step S170, the HVECU 70 sets a predetermined value S2 that is lower than the predetermined value S1, to the target state of charge SOC* of the battery 50 (step S180). The predetermined value S2 used may be, for example, 48%, 50% or 52%. In this case, state of charge reduction control is performed to reduce the state of charge SOC of the battery 50. More specifically, the "state of charge reduction control" denotes controlling the engine 22 and the motors MG1 and MG2, such that the state of charge SOC of the battery 50 becomes close to the predetermined value S2.

The HVECU 70 then determines whether the current trip terminates (step S200). When it is determined that the current trip does not terminate, the HVECU 70 returns to step S160. When it is determined that the current trip terminates, on the other hand, the HVECU 70 terminates this routine. When the temperature tm2 of the motor MG2 is continuously equal to or lower than the reference value tm2ref after the remaining distance L to the object predetermined point P[i] becomes equal to or shorter than the predetermined distance L1, the HVECU 70 repeats the processing of steps S160 to S180 and step S200. The HVECU 70 terminates this routine when it is determined at step S200 that the current trip terminates.

In this case, the state of charge reduction control is performed in the current trip, and the predetermined value S1 is set to the target state of charge SOC* of the battery 50 at the start of a next trip. Accordingly, state of charge recovery control is performed in the next trip to recover the state of charge SOC of the battery 50. More specifically, the "state of charge recovery control" denotes controlling the engine 22 and the motors MG1 and MG2 such that the state of charge SOC of the battery 50 becomes close to the predetermined value S1 (in the next trip) after the state of charge reduction control is performed.

Figure 4:
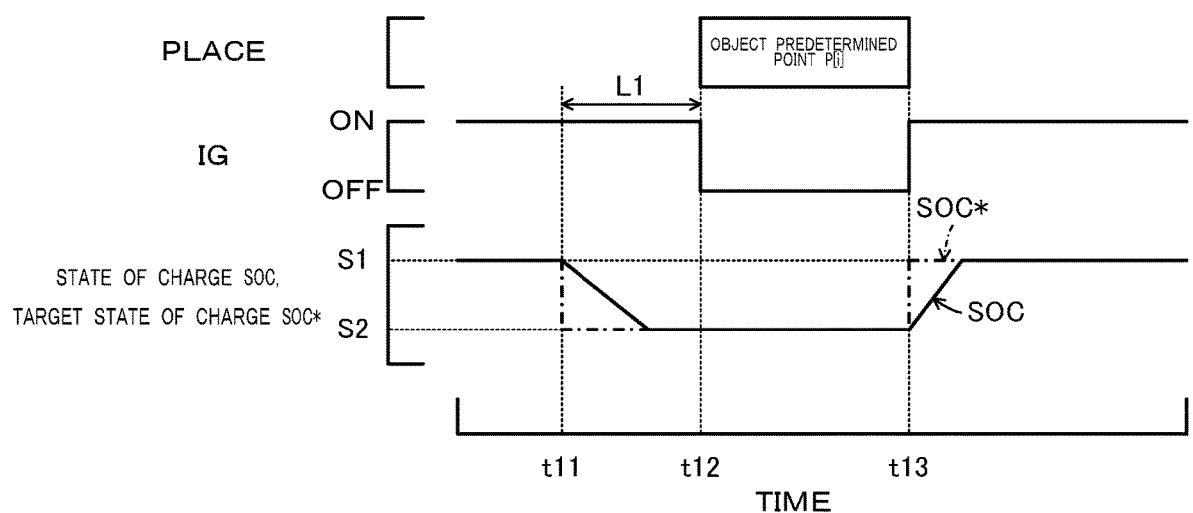
FIG. 4 is a diagram illustrating one example of performing state of charge reduction control and state of charge recovery control.

FIG. 4 is a diagram illustrating one example of performing the state of charge reduction control and the state of charge recovery control. When the remaining distance L to the object predetermined point P[i] becomes equal to or shorter than the predetermined distance L1 (at time t11) in a current trip, the state of charge reduction control is performed (to change the target state of charge SOC* of the battery 50 from the predetermined value S1 to the predetermined value S2). This reduces the state of charge SOC of the battery 50 (to be close to the predetermined value S2) at the end of the current trip (at time t12) and at the start of a next trip (at time t13). The state of charge recovery control is then performed in the next trip (at and after time t13) (to set the predetermined value S1 to the target state of charge SOC* of the battery 50). This recovers the state of charge SOC of the battery 50 (to be close to the predetermined value S1). Compared with a configuration that does not perform the state of charge reduction control in a current trip and accordingly provides the high state of charge SOC of the battery 50 (to be close to the predetermined value S1) at the start of a next trip, this series of controls reduces the charge-discharge required power Pb* of the battery 50 (i.e., increases as the value for charging) and thereby increases the required power Pe* to increase the output of the engine 22 during operation of the engine 22 in response to a request for heating the passenger compartment, a request for warming up the engine 22 and a request for warming up the catalyst 25a in the next trip. This series of controls accordingly enables the battery 50 to be charged, while operating the engine 22 at an operation point of high efficiency, ensuring fully sufficient heat for heating, and accelerating the warming-up of the engine 22 and the warming-up of the catalyst 25a. As a result, this improves energy efficiency.

When the temperature tm2 of the motor MG2 is higher than the reference value tm2ref at step S170 in the target state of charge setting routine of FIG. 3, the HVECU 70 sets the predetermined value S1 to the target state of charge SOC* of the battery 50 (step S190) and then proceeds to step S200. Accordingly, when the temperature tm2 of the motor MG2 is higher than the reference value tm2ref immediately after the remaining distance L to the object predetermined point P[i] becomes equal to or shorter than the predetermined distance L1 at step S150 or when the temperature tm2 of the motor MG2 becomes higher than the reference value tm2ref under the state of charge reduction control, execution of the state of charge reduction control is prohibited (more specifically, non-execution of the state of charge reduction control is maintained when the state of charge reduction control is not being performed, while the state of charge reduction control is stopped when the state of charge reduction control is being performed).

Execution of the state of charge reduction control reduces the state of charge SOC of the battery 50 from the level close to the predetermined value S1 to the level close to the predetermined value S2. This is likely to decrease the output of the engine 22 and the power generated by the motor MG1 and to increase the power consumed by the motor MG2. As a result, this is likely to increase the temperature tm2 of the motor MG2. Accordingly, when the temperature tm2 of the motor MG2 is higher than the reference value tm2ref, execution of the state of charge reduction control is prohibited. This suppresses the temperature tm2 of the motor MG2 from reaching the restriction start temperature tm2lim. As a result, this suppresses the driving restriction of the motor MG2 from being imposed (i.e., suppresses deterioration of the power performance) and thereby suppresses deterioration of the driving performance of the vehicle.

When the temperature tm2 of the motor MG2 becomes equal to or lower than the reference value tm2ref during repetition of the processing of steps S160, S170, S190 and S200, the state of charge reduction control is performed (i.e., started). This reduces the state of charge SOC of the battery 50 and allows the state of charge recovery control to be performed in the next trip. In order to avoid a frequent changeover between execution and prohibition of the state of charge reduction control, a hysteresis (margin) may be set to the reference value tm2ref in the case of increasing the temperature tm2 of the motor MG2 and in the case of decreasing the temperature tm2 of the motor MG2. The degree of such a hysteresis may be, for example, several degrees centigrade.

As described above, even in the case where parking is expected at the object predetermined point P[i], when the temperature tm2 of the motor MG2 is higher than the reference value tm2ref, the hybrid vehicle 20 of the embodiment prohibits execution of the state of charge reduction control. This configuration suppresses the temperature tm2 of the motor MG2 from reaching the restriction start temperature tm2lim. As a result, this suppresses deterioration of the power performance of the motor MG2 and thereby suppresses deterioration of the driving performance of the vehicle.

Figure 5:
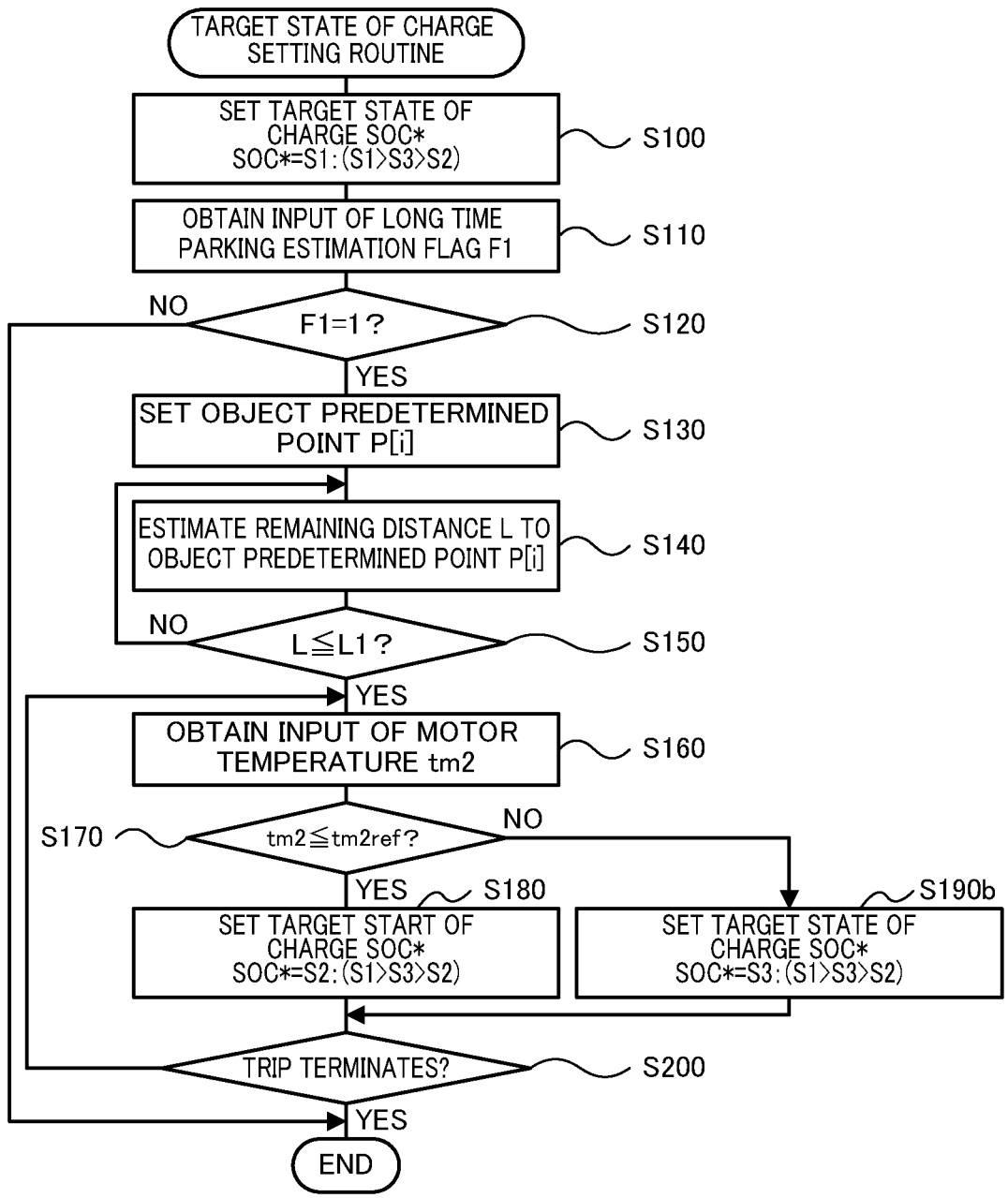
FIG. 5 is a flowchart showing one example of the target state of charge setting routine according to a modification.

In the hybrid vehicle 20 of the embodiment, the HVECU 70 performs the target state of charge setting routine shown in FIG. 3. A modification may perform another target state of charge setting routine shown in FIG. 5, in place of the target state of charge setting routine of FIG. 3. The target state of charge setting routine of FIG. 5 is similar to the target state of charge setting routine of FIG. 3, expect the processing of step S190b executed in place of the processing of step S190. The like processes are expressed by the like step numbers, and their detailed description is omitted.

In the target state of charge setting routine of FIG. 5, when the temperature tm2 of the motor MG2 is higher than the reference value tm2ref at step S170, the HVECU 70 sets a predetermined value S3 that is lower than the predetermined value S1 and that is higher than the predetermined value S2, to the target state of charge SOC* of the battery 50 (step S190b) and then proceeds to step S200. The predetermined value S3 used here is an approximately middle value between the predetermined value S1 and the predetermined value S2 and may be, for example, 54%, 55% or 56%. In this modification, second state of charge reduction control is performed in the current trip to restrict the amount of reduction in the state of charge SOC of the battery 50, compared with the state of charge reduction control described above. More specifically, the "second state of charge reduction control" denotes controlling the engine 22 and the motors MG1 and MG2 such that the state of charge SOC of the battery 50 becomes close to the predetermined value S3. This modified configuration also suppresses an increase in the temperature tm2 of the motor MG2 to some extent, compared with the configuration that performs the state of charge reduction control when the temperature tm2 of the motor MG2 is higher than the reference value tm2ref.

Figure 6:
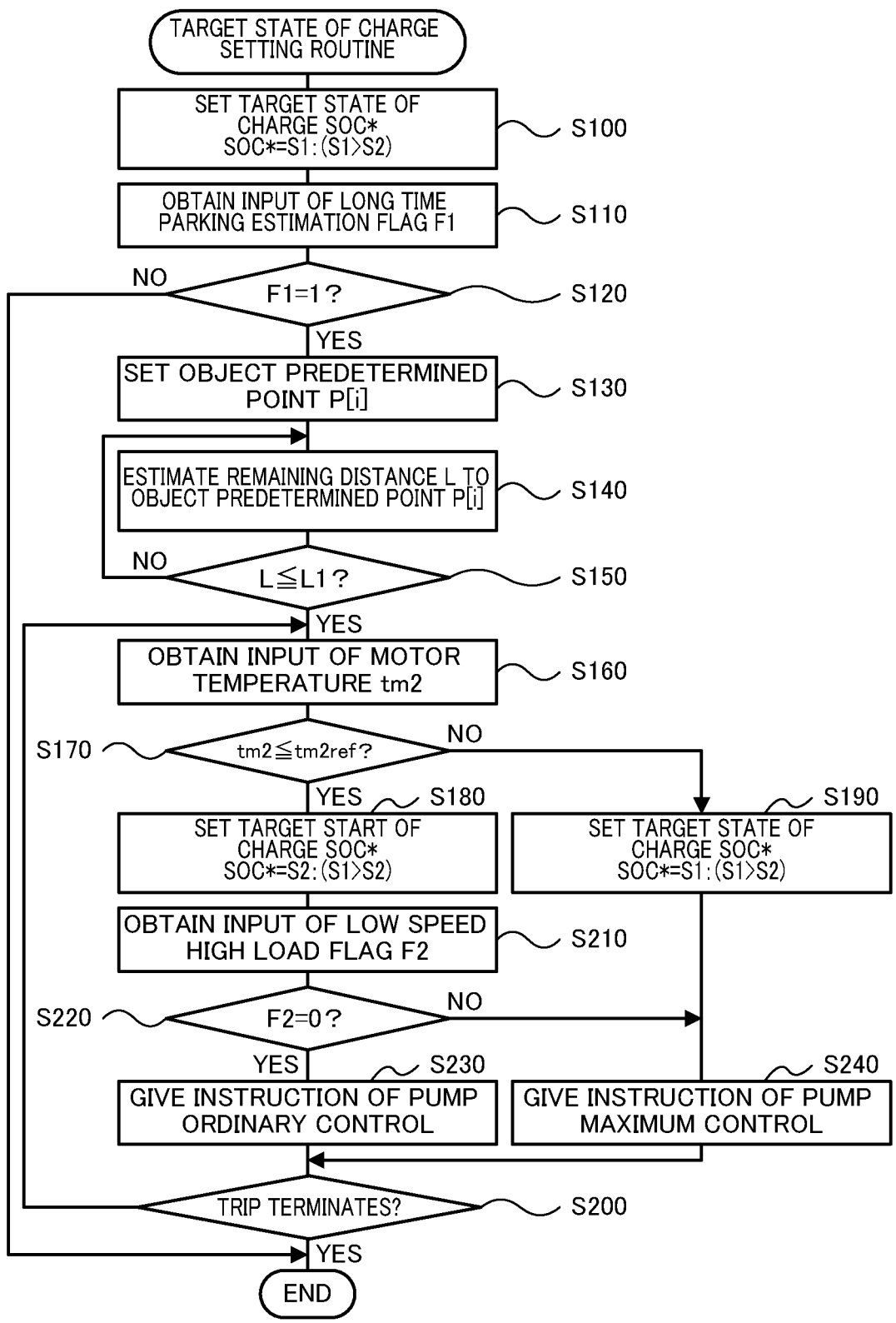
FIG. 6 is a flowchart showing another example of the target state charge setting routine according to another modification.

In the hybrid vehicle 20 of the embodiment, the HVECU 70 performs the target state of charge setting routine shown in FIG. 3. A modification may perform another target state of charge setting routine shown in FIG. 6, in place of the target state of charge setting routine of FIG. 3. The target state of charge setting routine of FIG. 6 is similar to the target state of charge setting routine of FIG. 3, expect addition of the processing of steps S210 to S240. The like processes are expressed by the like step numbers, and their detailed description is omitted. Although not being specifically described, the HVECU 70 performs ordinary control of the pressure feed pump 93 basically (more specifically, when the long time parking estimation flag F1 is equal to the value 0 at step S120 in the target state of charge setting routine of FIG. 6). The ordinary control of the pressure feed pump 93 drives and stops driving the pressure feed pump 93 at three different levels Lo, Mid, and Hi, based on the temperature tm2 of the motor MG2 and the like.

In the target state of charge setting routine of FIG. 6, when the temperature tm2 of the motor MG2 is higher than the reference value tm2ref at step S170, the HVECU 70 sets the predetermined value S1 to the target state of charge SOC* of the battery 50 (step S190), determines that maximum control of the pressure feed pump 93 is to be performed (step S240) and then proceeds to step S200. In this case, the HVECU 70 performs the maximum control of the pressure feed pump 93. The maximum control of the pressure feed pump 93 forcibly controls the pressure feed pump 93 at the level fixed to Hi, such as to maximize the pressure feed amount of the cooling oil. This control suppresses the temperature tm2 of the motor MG2 from reaching the restriction start temperature tm2lim.

When the temperature tm2 of the motor MG2 is equal to or lower than the reference value tm2ref at step S170, on the other hand, the HVECU 70 sets the predetermined value S2 to the target state of charge SOC* of the battery 50 (step S180), obtains the input of a low speed high load flag F2 (step S210) and checks the value of the input low speed high load flag F2 (step S220). The low speed high load flag F2 is set to a value 1 when the hybrid vehicle 20 is in a low speed high load drive where the vehicle speed V is equal to or lower than a predetermined vehicle speed Vref and the load exceeds a predetermined load or is expected to exceed the predetermined load, while being set to a value 0 when the hybrid vehicle 20 is not in the low speed high load drive. The predetermined vehicle speed Vref is specified as an upper limit of a vehicle speed range that is determined to have low cooling performance of the motor MG2 by the driving wind or the like. The case where the load exceeds the predetermined load may be, for example, the case where the current accelerator position Acc is larger than a reference value Aref, the case where the current required torque Td* is higher than a reference value Tdref, or the case where the current required power Pd* is higher than a reference value Pdref. The case where the load is expected to exceed the predetermined load may be, for example, an uphill road having a road surface gradient θd that is greater than a predetermined gradient θdref or a difference in elevation ΔH that is greater than a predetermined difference in elevation ΔHref. The road surface gradient θd and the difference in elevation ΔH may be, for example, values obtained from the map information of the vehicle-mounted navigation system 60 or the cloud server CS. The respective reference values are determined appropriately.

When the low speed high load flag F2 is equal to the value 0 at step S220, the HVECU 70 determines that the hybrid vehicle 20 is not in the low speed high load drive, determines that ordinary control of the pressure feed pump 93 is to be performed (step S230) and then proceeds to step S200. In this case, the HVECU 70 performs the ordinary control of the pressure feed pump 93.

When the low speed high load flag F2 is equal to the value 1 at step S220, on the other hand, the HVECU 70 determines that the hybrid vehicle 20 is in the low speed high load drive, determines that the maximum control of the pressure feed pump 93 is to be performed (step S240) and then proceeds to step S200. In this case, the HVECU 70 performs the maximum control of the pressure feed pump 93.

As described above, performing the state of charge reduction control is likely to increase the temperature tm2 of the motor MG2. The low speed high load drive provides a large amount of heat generation in the motor MG2 and low cooling performance of the motor MG2 or the like by the driving wind or the like and is thus more likely to increase the temperature tm2 of the motor MG2. By taking into account the foregoing, the maximum control of the pressure feed pump 93 is performed when the temperature tm2 of the motor MG2 is equal to or lower than the reference value tm2ref, the state of charge reduction control is performed, and the hybrid vehicle 20 is in the low speed high load drive. This configuration suppresses the temperature tm2 of the motor MG2 from becoming higher than the reference value tm2ref, while performing the state of charge reduction control.

Figure 7:
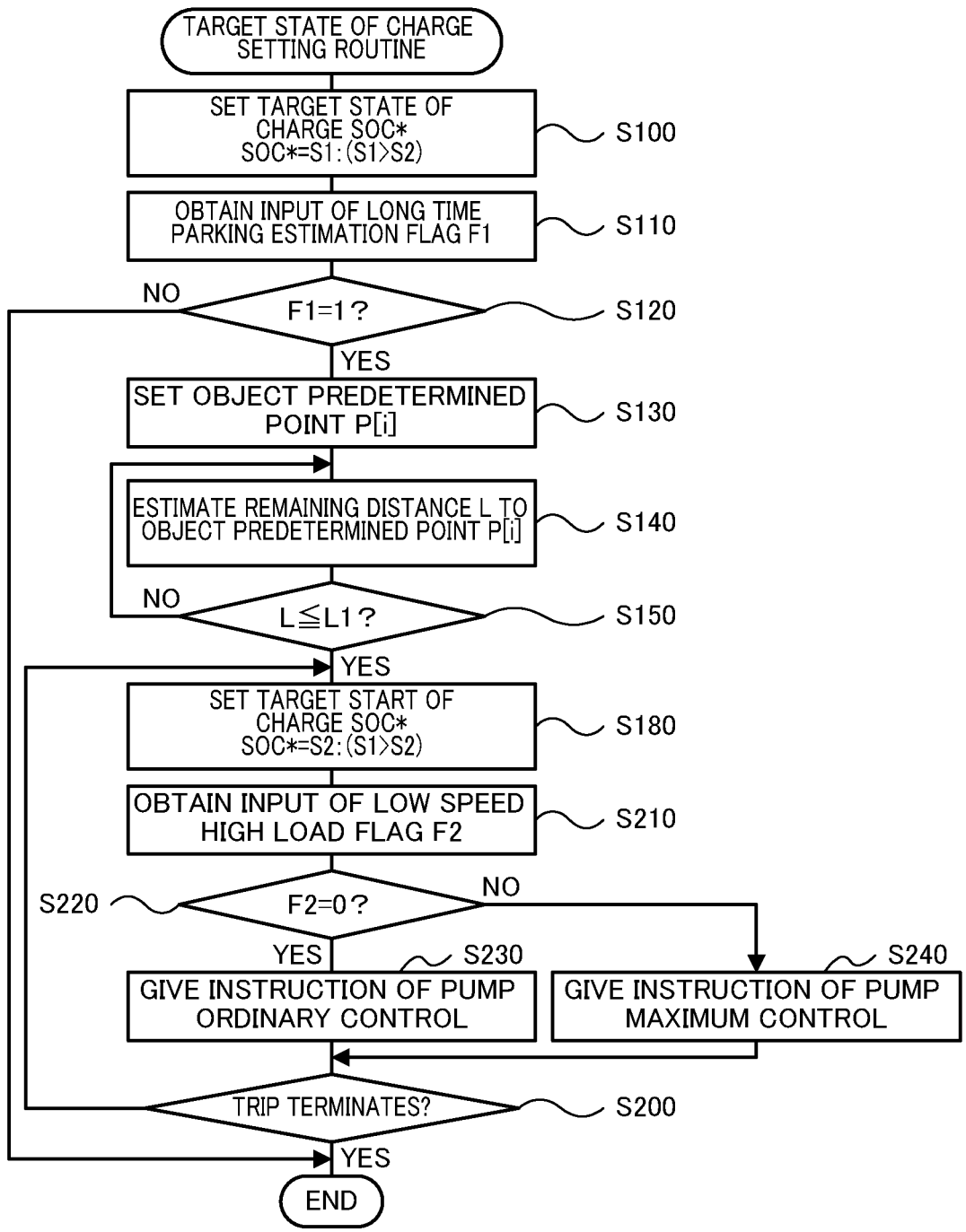
FIG. 7 is a flowchart showing another example of the target state charge setting routine according to another modification.

According to the above modification, the HVECU 70 performs the target state of charge setting routine shown in FIG. 6. Another modification may perform another target state of charge setting routine shown in FIG. 7, in place of the target state of charge setting routine of FIG. 6. The target state of charge setting routine of FIG. 7 is similar to the target state of charge setting routine of FIG. 6, expect omission of the processing of steps S160, S170 and S190. The like processes are expressed by the like step numbers, and their detailed description is omitted.

In the target state of charge setting routine of FIG. 7, when it is determined at step S150 that the remaining distance L to the object predetermined point P[i] becomes equal to or shorter than the predetermined distance L1, the HVECU 70 sets the predetermined value S2 that is lower than the predetermined value S1, to the target state of charge SOC* of the battery 50, irrespective of the temperature tm2 of the motor MG2 (step S180) and proceeds to step S210. In this case, the state of charge reduction control is performed, irrespective of the temperature tm2 of the motor MG2. Accordingly, the ordinary control of the pressure feed pump 93 is performed when the state of charge reduction control is performed but the hybrid vehicle 20 is not in the low speed high load drive. The maximum control of the pressure feed pump 93 is performed when the state of charge reduction control is performed and the hybrid vehicle 20 is in the low speed high load drive. This configuration also suppresses the temperature tm2 of the motor MG2 from reaching the restriction start temperature tm2lim.

Figure 8:
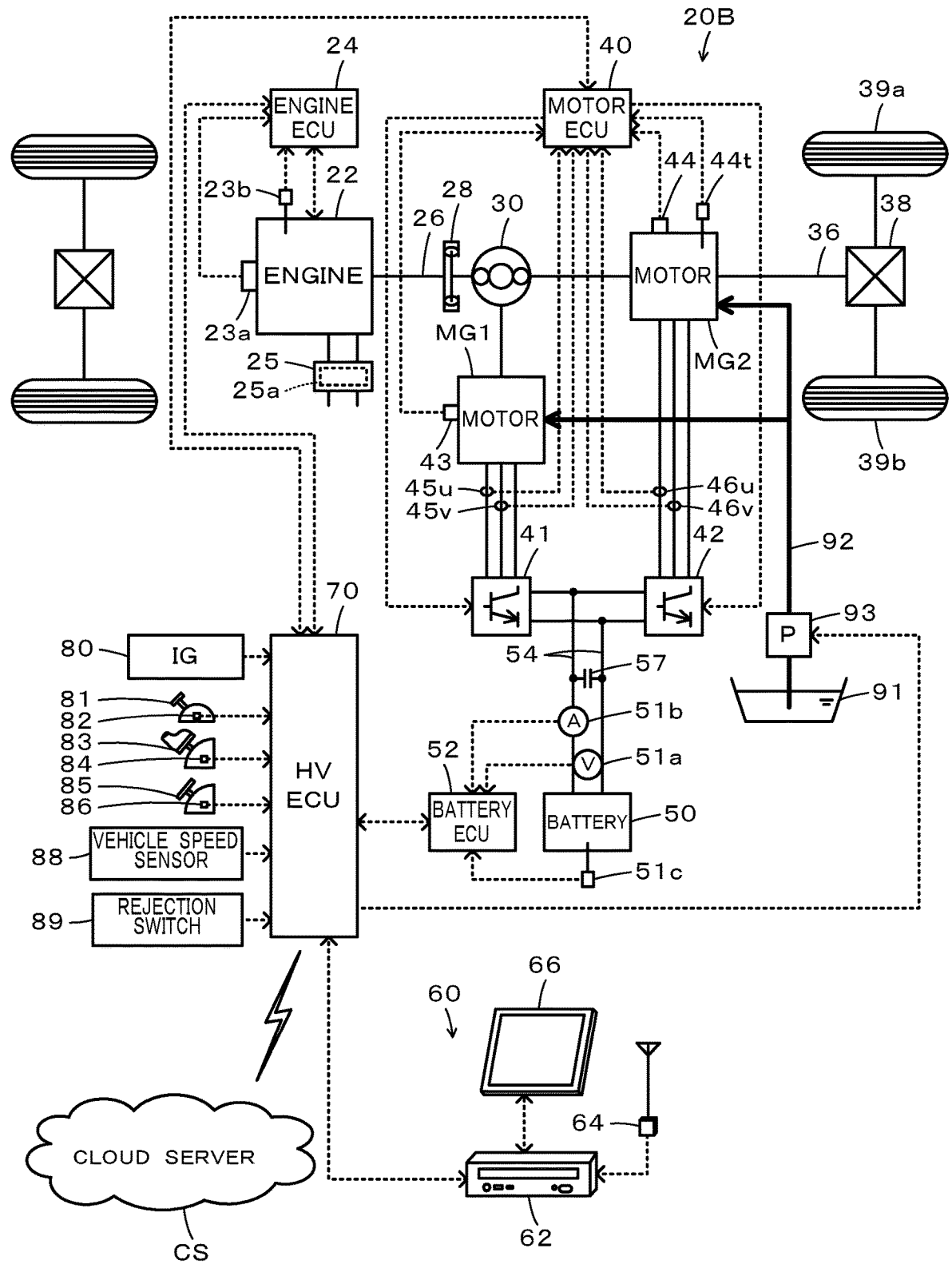
FIG. 8 is a configuration diagram illustrating the schematic configuration of a hybrid vehicle according to a modification.

A modified configuration of the hybrid vehicle 20 of the embodiment may be further provided with a rejection switch 89 operated to give an instruction to reject restriction (including prohibition) of execution of the state of charge reduction control, in addition to the configuration of the hybrid vehicle 20, as shown in a hybrid vehicle 20B according to a modification of FIG. 8. In this case, a rejection signal from the rejection switch 89 is additionally input into the HVECU 70. In the configuration of this hybrid vehicle 20B, the HVECU 70 may perform a target state of charge setting routine of FIG. 9 or a target state of charge setting routine of FIG. 10, in place of the target state of charge setting routine of FIG. 3 or FIG. 5. The following sequentially describes the target state of charge setting routines of FIG. 9 and FIG. 10.

Figure 9:
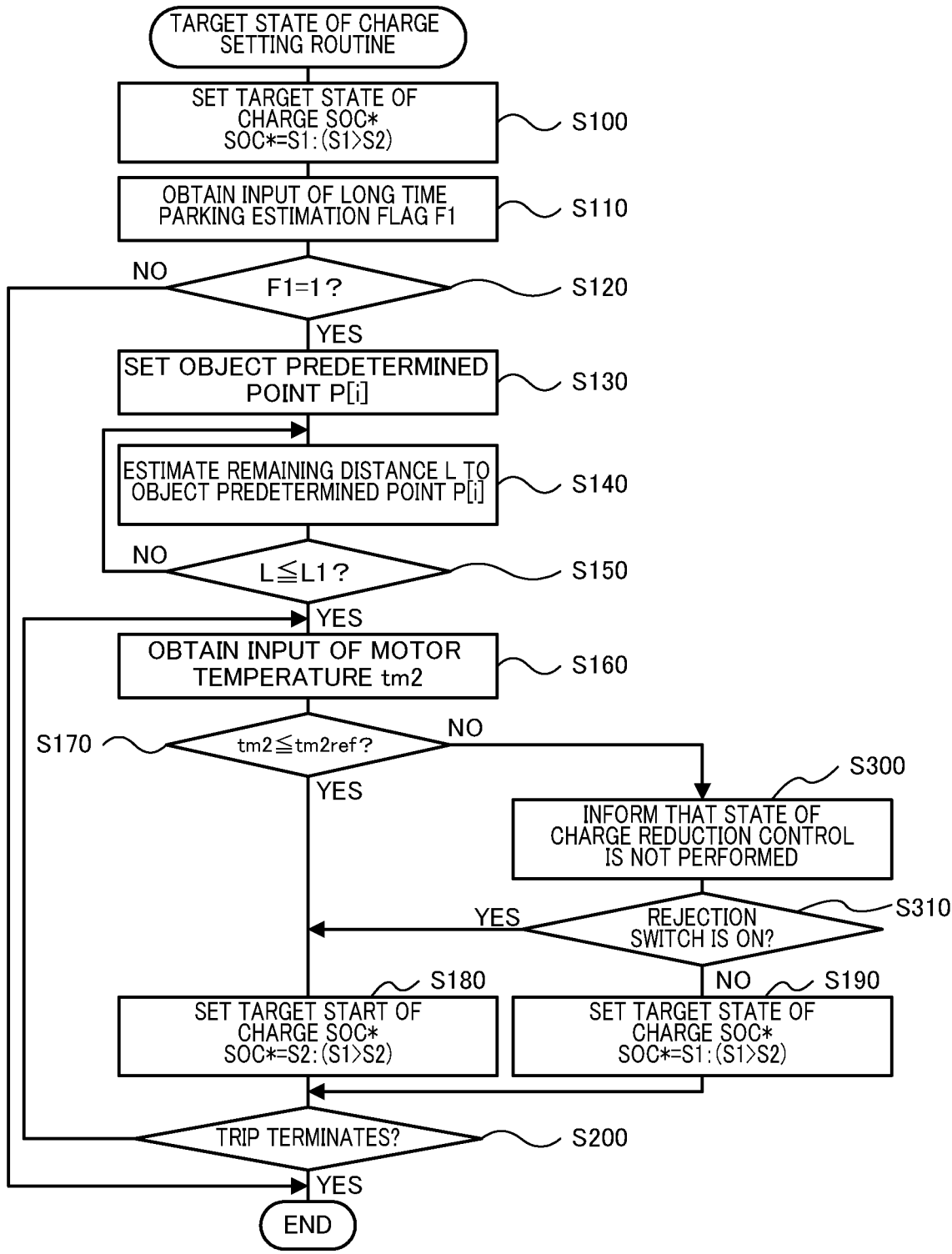
FIG. 9 is a flowchart showing one example of the target state of charge setting routine according to the modification.

The target state of charge setting routine of FIG. 9 is described below. The target state of charge setting routine of FIG. 9 is similar to the target state of charge setting routine of FIG. 3, expect addition of the processing of steps S300 and S310. The like processes are expressed by the like step numbers, and their detailed description is omitted.

In the target state of charge setting routine of FIG. 9, when the temperature tm2 of the motor MG2 is higher than the reference value tm2ref at step S170, the HVECU 70 informs the user that the state of charge reduction control is not expected to be performed, by display on the display 66 or by voice output (step S300) and checks whether the rejection switch 89 is on or off (step S310). When the rejection switch 89 is off, the HVECU 70 sets the predetermined value S1 to the target state of charge SOC* of the battery 50 (step S190) and then proceeds to step S200. In this case, the state of charge reduction control is not performed in the current trip.

When the rejection switch 89 is on at step S310, on the other hand, the HVECU 70 sets the predetermined value S2 that is lower than the predetermined value S1, to the target state of charge SOC* of the battery 50 (step S180) and then proceeds to step S200. In this case, the state of charge reduction control is performed in the current trip. Even when the temperature tm2 of the motor MG2 is higher than the reference value tm2ref, this configuration enables the state of charge reduction control to be performed with reflection of the user's intention in response to the user's on operation of the rejection switch 89. Furthermore, this configuration informs the user that the state of charge reduction control is not expected to be performed and thereby enables the user to recognize such expectation and select whether the rejection switch 89 is to be turned on.

Figure 10:
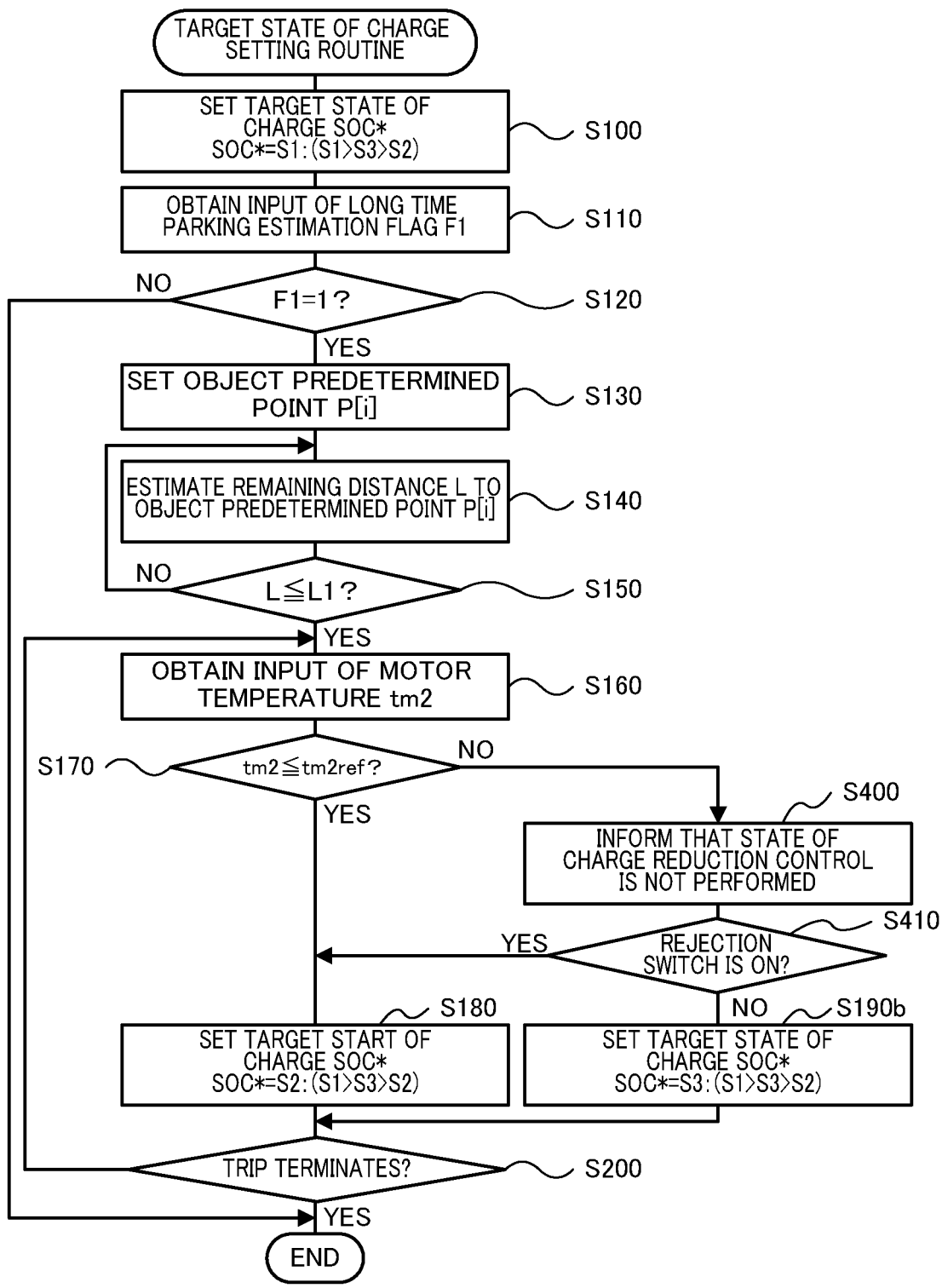
FIG. 10 is a flowchart showing another example of the target state of charge setting routine according to the modification.

The target state of charge setting routine of FIG. 10 is described below. The target state of charge setting routine of FIG. 10 is similar to the target state of charge setting routine of FIG. 5, expect addition of the processing of steps S400 and S410. The like processes are expressed by the like step numbers, and their detailed description is omitted.

In the target state of charge setting routine of FIG. 10, when the temperature $tm2$ of the motor MG2 is higher than the reference value $tm2ref$ at step S170, the HVECU 70 informs the user that the state of charge reduction control is not expected to be performed (but that the second state of charge reduction control is expected to be performed), by display on the display 66 or by voice output (step S400) and checks whether the rejection switch 89 is on or off (step S410). When the rejection switch 89 is off, the HVECU 70 sets the predetermined value S3 to the target state of charge SOC* of the battery 50 (step S190*b*) and then proceeds to step S200. In this case, the second state of charge reduction control is performed in the current trip.

When the rejection switch 89 is on at step S410, on the other hand, the HVECU 70 sets the predetermined value S2 that is lower than the predetermined value S1, to the target state of charge SOC* of the battery 50 (step S180) and then proceeds to step S200. In this case, the state of charge reduction control is performed in the current trip. Even when the temperature $tm2$ of the motor MG2 is higher than the reference value $tm2ref$, this configuration enables the state of charge reduction control to be performed with reflection of the user's intention, in response to the user's on operation of the rejection switch 89. Furthermore, this configuration informs the user that the state of charge reduction control is not expected to be performed and thereby enables the user to recognize such expectation and select whether the rejection switch 89 is to be turned on.

In the hybrid vehicle 20 of the embodiment, the state of charge reduction control sets the predetermined value S2 that is lower than the predetermined value S1 set in the case where the state of charge reduction control is not performed, to the target state of charge SOC* of the battery 50. The subject of the state of charge reduction control is, however, not limited to the target state of charge SOC* of the battery 50. According to a modification, the state of charge reduction control may set a lower value than a value set in the case where the state of charge reduction control is not performed, to a starting state of charge SOCst, which denotes the state of charge SOC for starting the engine 22 to forcibly charge the battery 50.

In the hybrid vehicle 20 of the embodiment, the state of charge reduction control sets the predetermined value S2 that is lower than the predetermined value S1 set in the case where the state of charge reduction control is not performed, to the target state of charge SOC* of the battery 50. According to a modification, the state of charge reduction control may set a higher value than a value set in the case where the state of charge reduction control is not performed, to the stop reference value Pstop or to the start reference value Pstart, in place of or in addition to the above setting. The subject of the state of charge reduction control is, however, not limited to the stop reference value Pstop or the start reference value Pstart with regard to the required power Pe* but may be any start reference value or a stop reference value relating to the driving output of the vehicle. For example, the state of charge reduction control may set a higher value than a value set in the case where the state of charge reduction control is not performed, to a start reference value or a stop reference value with regard to the accelerator position Acc, to a start reference value or a stop reference value with regard to the vehicle speed V, to a start reference value or a stop reference value with regard to the required torque Td*, to a start reference value or a stop reference value with regard to the required power Pd*, to a start reference value or a stop reference value with regard to the actual torque Td of the driveshaft 36, to a start reference value or a stop reference value with regard to the actual power Pd of the driveshaft 36, or to a start reference value or a stop reference value with regard to the actual power Pe of the engine 22.

In the hybrid vehicle 20 of the embodiment, the vehicle-mounted navigation system 60 is used to set a destination, to set an estimated driving route from the current location of the own vehicle to the destination and to perform route guidance of the estimated driving route. According to a modification, a personal digital assistance (for example, a smartphone or a tablet computer) configured to be communicable with the HVECU 70 by wireless communication may be used to set a destination, to set an estimated driving route from the current location of the own vehicle to the destination and to perform route guidance of the estimated driving route. In this modification, the target state of charge setting routine of FIG. 3 may obtain the input of a destination from the personal digital assistance, instead of obtaining the input of a destination from the vehicle-mounted navigation system 60.

The hybrid vehicle 20 of the embodiment is provided with the vehicle-mounted navigation system 60. A hybrid vehicle of a modification may not be provided with the vehicle-mounted navigation system 60.

The hybrid vehicle 20 of the embodiment is a motor vehicle configured without a connector or the like that is connectable with an external power source or more specifically a motor vehicle configured not to perform external charging that charges the battery 50 using electric power from an external power source. The present disclosure may, however, be applied to a motor vehicle that is capable of performing external charging. In this modification, it is preferable to set (register) a point where external charging is not expected to be performed, as the predetermined point. When external charging is expected to be performed during long time parking at the predetermined point, there is little need to perform the state of charge reduction control prior to the long time parking.

The hybrid vehicle 20 of the embodiment uses the battery 50 as the power storage device. The power storage device used may be a capacitor, in place of the battery 50.

The hybrid vehicle 20 of the embodiment includes the engine ECU 24, the motor ECU 40, the battery ECU 52 and the HVECU 70. At least two of these ECUs may be configured by a single electronic control unit.

Figure 11:
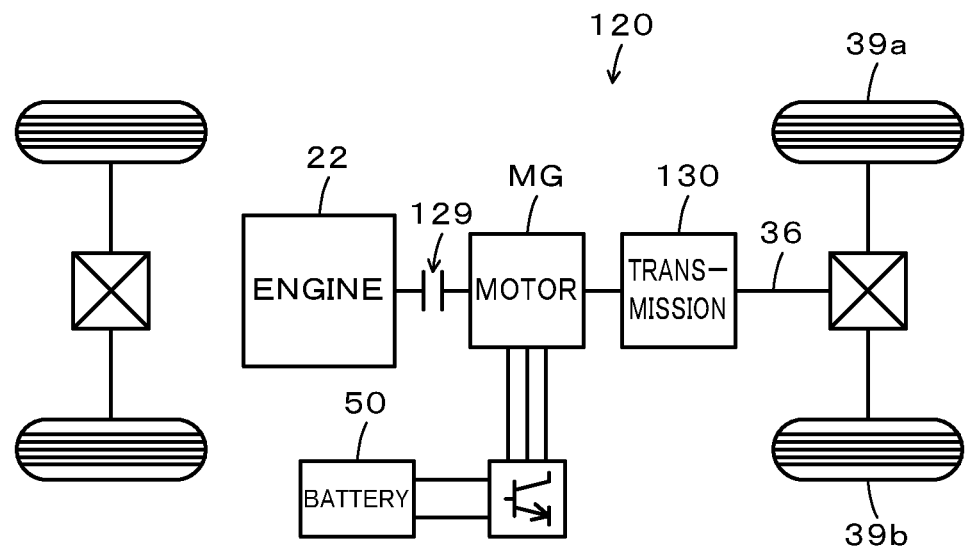
FIG. 11 is a configuration diagram illustrating the schematic configuration of another hybrid vehicle according to a modification.
Figure 12:
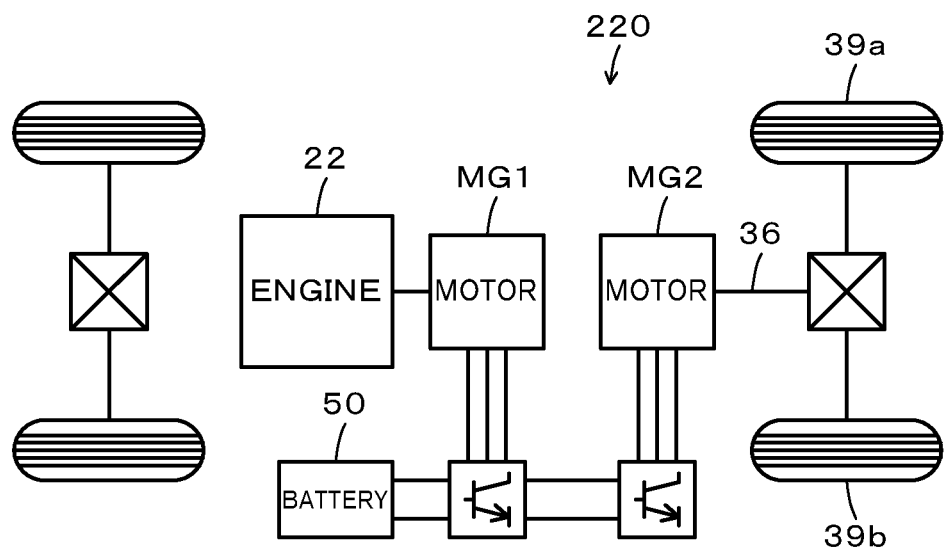
FIG. 12 is a configuration diagram illustrating the schematic configuration of another hybrid vehicle according to another modification.

The hybrid vehicle 20 of the embodiment is configured such that the engine 22 and the motor MG1 are connected via the planetary gear 30 with the driveshaft 36 which is coupled with the drive wheels 39*a* and 39*b*, that the motor MG2 is connected with the driveshaft 36, and that the battery 50 is connected with the motors MG1 and MG2 via the power lines. The present disclosure may, however, be applicable to a one-motor hybrid vehicle configured such that a motor MG is connected via a transmission 130 with a driveshaft 36 which is coupled with drive wheels 39*a* and 39b, that an engine 22 is connected with the motor MG via a clutch 129, and that a battery 50 is connected with the motor MG via power lines, like a hybrid vehicle 120 of a modification shown in FIG. 11. The present disclosure may also be applicable to a series hybrid vehicle configured such that a motor MG1 for power generation is connected with an engine 22, that a motor MG2 for driving is connected with a driveshaft 36 which is coupled with drive wheels 39a and 39b, and that a battery 50 is connected with the motors MG1 and MG2 via power lines, like a hybrid vehicle 220 of another modification shown in FIG. 12.

The embodiment describes the application of the present disclosure to the hybrid vehicle 20. The present disclosure may also be applied to a control device mounted on the hybrid vehicle 20. In this aspect, the HVECU 70, the engine ECU 24, the motor ECU 40 and the battery ECU 52 correspond to the "control device".

In the first hybrid vehicle of the above aspect, even when parking is expected at the predetermined point, the control device may prohibit execution of the state of charge reduction control in the case where the temperature of the motor is higher than the predetermined temperature. This configuration more effectively suppresses an excessive temperature rise of the motor.

In the first hybrid vehicle of the above aspect, when execution of the state of charge reduction control is expected to be restricted, the control device may inform the expectation. This configuration causes the user to recognize that execution of the state of charge reduction control is to be restricted.

In the first hybrid vehicle of the above aspect, even when execution of the state of charge reduction control is expected to be restricted, the control device may not restrict execution of the state of charge reduction control, in response to an instruction given to reject restriction of execution of the state of charge reduction control. This configuration enables the user's intention to be reflected.

In the first hybrid vehicle of the above aspect, when parking is expected at the predetermined point and the temperature of the motor is equal to or lower than the predetermined temperature, in a case where the hybrid vehicle is in a low speed high load drive having a vehicle speed that is equal to or lower than a predetermined vehicle speed and having a load that exceeds or is expected to exceed a predetermined load, the control device may perform the state of charge reduction control and forcibly drives a pressure feed pump configured to press feed a cooling medium to the motor. This configuration suppresses a temperature rise of the motor, while performing the state of charge reduction control. "Forcibly driving the pressure feed pump" herein means that the pressure feed pump is driven irrespective of the temperature of the motor or the like.

In the first and the second hybrid vehicle of the above aspect, the control device may determine whether parking at the predetermined point is expected or not, based on whether a destination is the predetermined point, and when no destination is set by a user, the control device may obtain a destination that is estimated based on a driving history by a vehicle exterior system. Even when no destination is set by the user, this configuration obtains an estimated destination from a vehicle exterior system (for example, a cloud server) and determines whether parking is expected at the predetermined point.

In the first and the second hybrid vehicle of the above aspect, the hybrid vehicle may be a motor vehicle configured not to perform external charging that charges the power storage device using electric power from an external power supply. And the hybrid vehicle may be a motor vehicle configured to be capable of performing external charging that charges the power storage device using electric power from an external power supply, and the predetermined point may be a point where the external charging is not expected to be performed. When external charging is expected to be performed during parking at the predetermined point, there is little need to perform the state of charge reduction control prior to the parking at the predetermined point.

The following describes the correspondence relationship between the primary elements of the above embodiment and the primary elements of the disclosure described in Summary. The engine 22 of the embodiment corresponds to the "engine", the motors MG1 and MG2 correspond to the "motor", the battery 50 corresponds to the "power storage device", and the HVECU 70, the engine ECU 24, the motor ECU 40 and the battery ECU 52 correspond to the "control device".

The correspondence relationship between the primary components of the embodiment and the primary components of the present disclosure, regarding which the problem is described in Summary, should not be considered to limit the components of the present disclosure, regarding which the problem is described in Summary, since the embodiment is only illustrative to specifically describes the aspects of the present disclosure, regarding which the problem is described in Summary. In other words, the present disclosure, regarding which the problem is described in Summary, should be interpreted on the basis of the description in Summary, and the embodiment is only a specific example of the present disclosure, regarding which the problem is described in Summary.

The aspect of the present disclosure is described above with reference to the embodiment. The present disclosure is, however, not limited to the above embodiment but various modifications and variations may be made to the embodiment without departing from the scope of the present disclosure.

INDUSTRIAL APPLICABILITY

The present disclosure is applicable to, for example, manufacturing industries of hybrid vehicles and control devices mounted thereon.

The invention claimed is:

1. A hybrid vehicle, comprising:
an engine;
a motor;
a power storage device configured to transmit electric power to and from the motor; and
a control device configured to, when parking is expected at a predetermined point, perform state of charge reduction control in a current trip and to perform state of charge recovery control in a next trip, wherein the state of charge reduction control controls the engine and the motor such that state of charge of the power storage device when parking is expected at the predetermined point is lower than the state of charge of the power storage device when parking is not expected at the predetermined point, and the state of charge recovery control controls the engine and the motor such that the state of charge of the power storage device is recovered during operation of the engine, wherein
even when parking is expected at the predetermined point, the control device restricts execution of the state of charge reduction control, in a case where a temperature of the motor is higher than a predetermined temperature, and when parking is expected at the predetermined point and the temperature of the motor is equal to or lower than the predetermined temperature, in a case where the hybrid vehicle is in a low speed high load drive having a vehicle speed that is equal to or lower than a predetermined vehicle speed and having a load that exceeds or is expected to exceed a predetermined load, the control device performs the state of charge reduction control and forcibly drives a pressure feed pump configured to press feed a cooling medium to the motor.

2. A hybrid vehicle, comprising:
an engine;
a motor;
a power storage device configured to transmit electric power to and from the motor; and
a control device configured to, when parking is expected at a predetermined point, perform state of charge reduction control in a current trip and to perform state of charge recovery control in a next trip, wherein the state of charge reduction control controls the engine and the motor such that state of charge of the power storage device when parking is expected at the predetermined point is lower than the state of charge of the power storage device when parking is not expected at the predetermined point, and the state of charge recovery control controls the engine and the motor such that the state of charge of the power storage device is recovered during operation of the engine, wherein
when the hybrid vehicle is in a low speed high load drive having a vehicle speed that is equal to or lower than a predetermined vehicle speed and having a load that exceeds or is expected to exceed a predetermined load, the control device forcibly drives a pressure feed pump configured to press feed a cooling medium to the motor, while performing the state of charge reduction control.

3. The hybrid vehicle according to claim 2,
wherein the control device determines whether parking at the predetermined point is expected or not, based on whether a destination is the predetermined point, and
when no destination is set by a user, the control device obtains a destination that is estimated based on a driving history by a vehicle exterior system.

4. The hybrid vehicle according to claim 2,
the hybrid vehicle being a motor vehicle configured not to perform external charging that charges the power storage device using electric power from an external power supply.

5. The hybrid vehicle according to claim 2,
the hybrid vehicle being a motor vehicle configured to be capable of performing external charging that charges the power storage device using electric power from an external power supply, and
the predetermined point is a point where the external charging is not expected to be performed.

6. A hybrid vehicle, comprising:
an engine;
a motor;
a power storage device configured to transmit electric power to and from the motor; and
a control device configured to, when parking is expected at a predetermined point, perform state of charge reduction control in a current trip and to perform state of charge recovery control in a next trip, wherein the state of charge reduction control controls the engine and the motor such that state of charge of the power storage device when parking is expected at the predetermined point is lower than the state of charge of the power storage device when parking is not expected at the predetermined point, and the state of charge recovery control controls the engine and the motor such that the state of charge of the power storage device is recovered during operation of the engine, wherein
even when parking is expected at the predetermined point, the control device restricts execution of the state of charge reduction control, in a case where a temperature of the motor is higher than a predetermined temperature,
wherein the control device determines whether parking at the predetermined point is expected or not, based on whether a destination is the predetermined point, and
when no destination is set by a user, the control device obtains a destination that is estimated based on a driving history by a vehicle exterior system.

7. A hybrid vehicle comprising:
an engine;
a motor;
a power storage device configured to transmit electric power to and from the motor; and
a control device configured to, when parking is expected at a predetermined point, perform state of charge reduction control in a current trip and to perform state of charge recovery control in a next trip, wherein the state of charge reduction control controls the engine and the motor such that state of charge of the power storage device when parking is expected at the predetermined point is lower than the state of charge of the power storage device when parking is not expected at the predetermined point, and the state of charge recovery control controls the engine and the motor such that the state of charge of the power storage device is recovered during operation of the engine, wherein
even when parking is expected at the predetermined point, the control device restricts execution of the state of charge reduction control, in a case where a temperature of the motor is higher than a predetermined temperature,
the hybrid vehicle being a motor vehicle configured to be capable of performing external charging that charges the power storage device using electric power from an external power supply, and
the predetermined point is a point where the external charging is not expected to be performed.

8. A control device mounted on a hybrid vehicle, the hybrid vehicle comprising an engine, a motor, and a power storage device configured to transmit electric power to and from the motor,
the control device being configured to, when parking is expected at a predetermined point, perform state of charge reduction control in a current trip and to perform state of charge recovery control in a next trip, wherein the state of charge reduction control controls the engine and the motor such that state of charge of the power storage device when parking is expected at the predetermined point is lower than the state of charge of the power storage device when parking is not expected at the predetermined point, and the state of charge recovery control controls the engine and the motor such that the state of charge of the power storage device is recovered during operation of the engine,
when the hybrid vehicle is in a low speed high load drive having a vehicle speed that is equal to or lower than a predetermined vehicle speed and having a load that exceeds or is expected to exceed a predetermined load, the control device forcibly drives a pressure feed pump configured to press feed a cooling medium to the motor, while performing the state of charge reduction control.

* * * * *